3,458,530
MULTI-PURPOSE POLYALKENYL SUCCINIC
ACID DERIVATIVE
Joel R. Siegel, Elizabeth, N.J., and Beverly A. Pawson, Cambridge, Mass., assignors to Esso Research and Engineering Company, a corporation of Delaware
No Drawing. Continuation-in-part of application Ser. No. 239,350, Nov. 21, 1962. This application May 6, 1963, Ser. No. 278,451
Int. Cl. C07d 27/10; C10m 1/32; C101 1/22
U.S. Cl. 260—326.5                    1 Claim The present invention is concerned with a novel class of compounds which are useful as multi-purpose additives, particularly in hydrocarbon compositions such as middle distillate fuels, gasolines, and lubricating oils. In particular, the present invention is concerned with a class of additives which comprises the reaction products of (1) a polyalkenyl succinic acid or anhydride, (2) a polyamine and (3) an aldehyde or ketone; and is believed to be characterized by the linkage (N=C). The compounds of the present invention are useful as anti-oxidants in hydrocarbons such as motor fuels and lubricating oils, as gum inhibitors in gasolines, and as sludge dispersants in diesel fuels and lubricating oils.

This application is a continuation-in-part of application S.N. 239,350, filed Nov. 21, 1962, now abandoned.

A very desirable multi-functional compound of the present invention comprises a compound wherein an azomethine linkage (—N=CHR), where R is selected from the group consisting of hydrogen, alkyl and aryl groups, is introduced into a polyalkylene amine imide or into an amide of a polyalkenyl succinic acid.

It is within the scope of the present invention to form the additives by reacting, for example, an alkenyl succinic anhydride with an aromatic or aliphatic polyamine to form the imide:

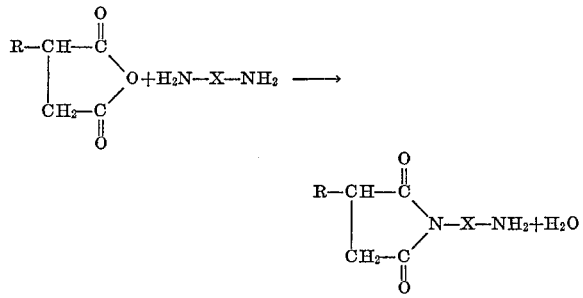

where X is phenylene or a hydrocarbon chain containing from about 2 to about 8 carbon atoms and from about 0 to 3 nitrogen atoms; and reacting the imide with an aliphatic or aromatic aldehyde or ketone to form the compound of the present invention. The mechanism of this second reaction is believed to be:

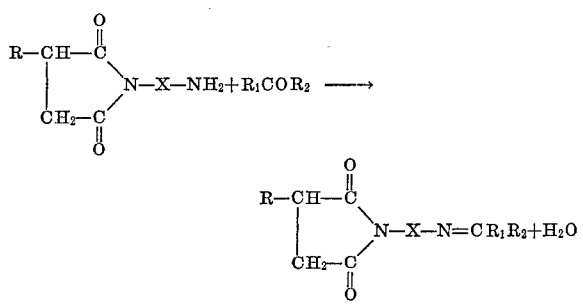

where $R_1$ and $R_2$ are selected from the group consisting of H, phenyl and alkyl groups.

Particularly desirable compounds can be secured by reacting either tetrapropenyl succinic anhydride or polybutenyl succinic anhydride with paraphenylene diamine to form the imide followed by reacting the imide with paraformaldehyde to form the product of the present invention. The products are believed to be azomethines. The reaction is as follows:

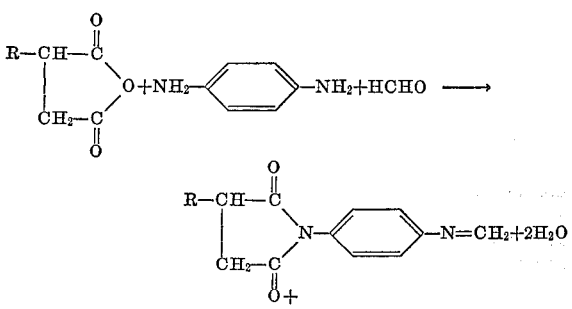

wherein R comprises a polyalkenyl group.

The polyalkenyl group includes all polymers between about 165 and 1800 molecular weight range wherein the alkenyl group may contain between about 12 and 130 carbon atoms.

The preparation of a polyalkenyl succinic anhydride is well known in the art and simply involves reacting maleic anhydride with an organic compound having an olefinic linkage. Generally, about equal molar proportions of maleic anhydride and the olefinic material are simply heated together. Specific polyalkenyl compounds for use in accordance with the present invention are, for example, tetrapropylene having a molecular weight of about 168 and the polybutenes having molecular weights of, for example, 240, 780, 940 and 1800.

Specific aldehydes and ketones for use in securing the compounds of the present invention are, for example, formaldehyde, propionaldehyde, butyraldehyde, n-valeraldehyde, caproaldehyde, isobutyraldehyde, heptaldehyde, benzaldehyde, cinnamaldehyde, acetone, methyl ethyl ketone, and acetophenone. In general, the aldehydes and ketones contain from about 1 to 10 carbon atoms, and it is preferred that they comprise from about 1 to 3 carbon atoms. Formaldehyde is especially preferred.

The polyamines used in the present invention contain from about 2 to 5 nitrogen atoms and from about 2 to 8 carbon atoms. Polyamines for use in securing the compounds of the present invention are, for example, ethylene diamine, diethylenetriamine, tetraethylene pentamine, triethylene tetramine, and mixtures thereof such as the broad spectrum of commercially available polyamine mixes.

It is to be understood that if aromatic diamines are used they may comprise the ortho, the meta or the para phenylene diamine, or any combination thereof.

Compounds of the present invention are prepared by a process which consists of two reactions. The first reaction is carried out by reacting a polyalkenyl succinic anhydride and a polyamine in a mole ratio of about 0.5/1 to about 1/1, preferably in an equal molar ratio, with separation of water to form the imide. The resulting imide contains a free amine group which is then reacted with an aliphatic or aromatic aldehyde or ketone, in a mole ratio of about 0.5/1 to 2/1, preferably an equal molar ratio, with the separation of water to form the (N=C) linkage.

Both reactions are carried out at a temperature in the range of about 140° C. to about 200° C., preferably in the range of about 160° C. to 165° C. The preferred pressure is about atmospheric pressure.

The following examples further describe the preparation of the compounds of the invention:

EXAMPLE 1

Into a 5-liter flask equipped with stirrer, thermometer and water separator, were placed 1675-8 gms. of a polyisobutenyl succinic anhydride (1800 mol. wt), 520 gms. of a Solvent 150 Neutral and 162 gms. of p-phenylenediamine. Then 800 cc. xylene was added and, when solution was completed, the mixture was refluxed for 8 hours at 165° C. During this operation 28.5 cc. of $H_2O$ was distilled off. After this, 48 gms. of p-formaldehyde was added and the mix was refluxed at 160° C. for 8 hours. 28 cc. of $H_2O$ was collected in this operation. The xylene was removed under high vacuum and the yield was 2337 gms. N%=1.61.

EXAMPLE 2

To 735 gms. (0.5 mole) of a polyisobutenyl succinic anhydride (76% concentrate in mineral oil) prepared from 900 mol. wt. polybutene, in 270 cc. xylene, 54 gms. (0.5 mole) p-phenylene diamine was added. The mixture was brought to reflux (160° C.) and azeotropically distilled until no additional water was formed. 6.5 cc. of the theoretical 9 cc. (0.5 mole) was collected. The reaction mixture was cooled and 16 gms. (0.5 mole) p-formaldehyde was added. The mixture was again refluxed and azeotropically distilled to yield 10 cc. of water (theoretical 9 cc.). Anti-foamant was aded to prevent excessive foaming during the second distillation. The xylene was removed under reduced pressure to yield a mixture containing approximately 75% product and 25% oil.

EXAMPLE 3

A compound was prepared according to the method of Examples 1 and 2. The reactants were equimolar proportions of polybutenil succinic anhydride (prepared from 240 mol. wt. polybutene), diethylene triamine, and benzaldehyde.

EXAMPLE 4

A compound was prepared according to the method of Examples 1 and 2. The reactants were equal molar proportions of tetrapropenyl succinic anhydride, p-phenylene diamine, and p-formaldehyde.

The above-described examples are illustrative only and are not intended to limit the present invention in any respect.

The examples show that the compounds may, if desired, be prepared as a concentrate in a mineral oil. The concentrate will normally consist of from about 10 wt. percent to 80 wt. percent product and from about 20 wt. percent to about 90 wt. percent mineral oil.

Compounds of the present invention are effective as additives in hydrocarbon oils such as middle distillate fuels, gasolines, lubricating oils and the like.

The compounds of the present invention are very effective as multi-purpose gasoline and fuel additives in the range of about 0.001 wt. percent to 5 wt. percent, preferably in the range of about 0.005 wt. percent to 0.1 wt. percent.

Petroleum distillate fuels boiling in the range of about 300° F. to 900° F. are contemplated. Typical of such fuels are No. 1 and No. 2 fuel oils meeting ASTM specification D-396-48T; diesel fuels qualifying as grades 1D, 2D and 4D of ASTM specification D-975-51T and jet engine fuels such as those covered by U.S. military specification MIL-F-5624C.

Thus, the additives of the present invention have potent anti-oxidant, anti-rust, and detergent properties. The additives improve the anti-icing characteristic of the fuel and also modify combustion chamber deposits. The additives have excellent hydrocarbon solubility, will not affect or attack brass and will not cause filter plugging due to zinc precipitate formation. The additives do not have an adverse effect on either fuel octane quality or gasoline stability. The additives have acceptable water tolerance properties.

The additives of the present invention may be employed in conjunction with a variety of other additives commonly used in fuels. Typical of such additives are rust inhibitors, corrosion inhibitors, anti-oxidants, dispersants, dyes, dye stabilizers, wax inhibitors, anti-static agents and the like. Anti-icing agents, for example, are isopropyl alcohol, hexylene glycol, Carbitol and other known anti-icing agents. Of particular interest is the combination of the additives of this invention with isopropyl alcohol as a combination anti-icing, anti-rust additive package.

The compounds of the present invention are also effective as lubricating oil additives in the concentration range of from about 0.001 wt. percent to about 10 wt. percent, preferably about 0.1 wt. percent to about 5 wt. percent. Lubricating oils to which the additives may be added include not only mineral lubricating oils but also synthetic oils. The mineral lubricating oils may be of any preferred type, including those derived from ordinary paraffinic, naphthenic, asphaltic, or mixed base mineral crude oils by suitable refining methods.

The additives of the present invention may be employed in lubricants in conjunction with other additives such as detergent type additives, e.g., metal organic sulfonates, metal alkyl phenol sulfides, etc., pour point depressants, dyes, anti-oxidants, viscosity index improvers and the like.

A number of tests were conducted using compounds of the present invention in various hydrocarbon compositions.

Test A—Gasoline anti-oxidant test

Test A consisted of (1) ASTM D-525 and (2) a copper beaker gum test for motor fuels.

A description of the former test may be found in ASTM Standard on Petroleum Products and Lubricants. In the latter test, an evaporating dish made of spun copper is carefully cleaned and weighed. A measured portion of the sample is added and the dish heated for 90 minutes at a temperature of 400° F. After cooling the dish is weighed again and the increase in weight calculated to milligrams of gum per 100 mls. of fuel.

RESULTS

|  | ASTM breakdown time, min. | Cu. beaker gum, mgs./ 100mle. |
|---|---|---|
| Base fuel [1] | 155 | 32.3 |
| +10#/thousand barrels additive of Example 2 | 210 | 16.3 |
| +20#/thousand barrels additive of Example 2 | 220 | 19.9 |
| +10#/thousand barrels additive of Example 4 | 200 | 16.4 |
| +20#/thousand barrels additive of Example 4 | 205 | 18.3 |

[1] Base fuel consisted of 33% lt. cat. naphtha, 33% heavy cat. naphtha and 33% cat. $C_5$'s (pentanes and pentenes) and was uninhibited. Boiling range was about 110° F. to 410° F.

From the above it is apparent that the additives of the present invention are effective gasoline anti-oxidants.

Test B.—Witt Diesel engine test (90 hrs.)
(1% Sulfur Fuel)

Test B was carried out using an additive of the present invention in a SAE 10W-30 motor oil. In this test a single cylinder engine is operated for 90 hours at 1665±5 r.p.m. and a jacket temperature of about 175° F. A lubricating oil containing a commercial detergent additive was compared with a lubricating oil containing an additive of the invention and engine deposits were determined with the following results:

| Composition (wt. percent) | Composition A | Composition B |
|---|---|---|
| Additive of Example 2 | 2.5 |  |
| Anti-wear agent | 0.9 | 0.9 |
| Mineral oil base | 96.6 | 96.8 |
| Commercial detergent inhibitor |  | 2.3 |
| RESULTS |  |  |
| Top groove fill (percent) | 1.5 | 20 |
| Ring zone area demerit | .05 | 0.18 |
| Ring zone area -1 groove demerit | .02 | 0.13 |
| Approval index (merit type rating) | 4 | 28 |

A ring zone demerit above .2 is considered poor and a demerit of 0 is very good.

The approval index is a function of percent top groove fill and the ring zone area −1 groove demerit. An index above 30 is considered unacceptable and a result of 4 is exceptionally good.

From the above it is apparent that an additive of the present invention was more effective than a commercially available detergent inhibitor in reducing deposits.

Test C—Ford engine test 4–90 low temperature sludging test

Test C was carried out to determine the effect of the additives of the invention on crankcase deposits. Briefly described, in this test, a Ford 6-cylinder engine is run on a dynamometer stand through a first cycle operating at 500 r.p.m. for 1½ hours, a second cycle operating at 2000 r.p.m. for 2 hours and a third cycle also operating at 2000 r.p.m. for 2 hours, but at a slightly higher radiator water temperature. After completion of the third cycle, the three cycles are repeated over and over again in sequence, until the desired total test time has elapsed. Make-up oil is added as required so that the crankcase oil level at all times is maintained between about 3½ and 4 quarts. The engine is inspected at the end of 66, 110, 154, 198, 242 and 286 hours of operation. This inspection is carried out by disassembling the engine sufficiently for visual examination of the following eight parts for sludge: rocker arm cover, push rod chamber cover, rocker arm assembly, crankshaft, cylinder head, oil pan, push rod chamber, and oil screen.

Each of the first seven parts is visually rated on a numerical scale where 10 is preferably clean and 0 is completely fouled and numbers between 0 and 10 denote varying amounts of deposits. The oil screen is rated as "percent covered with sludge."

COMPOSITIONS TESTED

| Composition (wt. percent) | C | D | E | F | G |
|---|---|---|---|---|---|
| Lubricating oil | 94.6 | 94.6 | 94.84 | 94.6 | 94.6 |
| Anti-wear agent | 0.9 | 0.9 | 0.9 | 0.9 | 0.9 |
| Detergent inhibitor | 4.5 | 3.5 | 3.5 | 3.5 | 3.5 |
| Additive of Example 2 | | | 0.76 | | |
| Additive X | | 1.0 | | | |
| Additive of Example 3 | | | | | 1.0 |
| Additive Y | | | | 1.0 | |

Additive X was the intermediate compound formed in preparing the Additive of Example 2 (i.e., the reaction product of polyisobutenyl succinic anhydride and p-phenylene diamine). Additive Y was the intermediate compound formed in preparing the Additive of Example 3 (i.e., the reaction product of polybutenyl succinic anhydride and diethylene triamine).

RESULTS

| | Merit rating | | | | |
|---|---|---|---|---|---|
| Time, (Hrs.) | C | D | E | F | G |
| 66 | 9.6 | 9.9 | 9.9 | 9.9 | 9.9 |
| 110 | 9.2 | 9.9 | 9.9 | 9.9 | 9.9 |
| 154 | 8.6 | 9.7 | 9.9 | 9.8 | 9.9 |
| 198 | 7.5 | 9.6 | 9.8 | 9.0 | 9.4 |
| 242 | 6.8 | 9.4 | 9.7 | 8.3 | 9.3 |
| 286 | 6.0 | 9.3 | 9.6 | 7.4 | 9.2 |

From the above it is apparent that additives of the present invention reduced crankcase deposits.

Test D—Anti-rust test

Test D was carried out to determine the anti-rust characteristics of the additives of the present invention and is a very severe test designed to predict rusting of hydraulic valve lifters. In this test new 1958 Oldsmobile valve lifters (cast iron containing a small amount of nickel) are disassembled into body and plunger. These pieces are degreased with solvent and are then allowed to dry. An agar gel collar is cast over the bottom half of each of the two lifter pieces. This collar promotes corrosion by masking half of each lifter piece from oxygen available during the test, i.e., it sets up an oxygen concentration cell. 10 gms. of test oil are diluted to 100 gms. with hexane. Clean and dry test pieces are soaked in a test solution for one hour, removed and air dried for 30 minutes. This leaves a very thin test oil film on the test pieces. The coated pieces are then covered with water which is aerated and held at 110° F. for 20 hours. Both the water and the agar gel contain $BaCl_2 \cdot H_2O$ for added severity. The pieces show rust in two areas. Red rust appears above the agar (exposed to oxygen-rich water) and black rust under the agar (exposed to oxygen-poor water). The two areas are rated for percent area covered with rust and the ratings for the two areas are averaged. In the test bath, pieces coated with a noninhibited motor oil are carried along as an internal standard to compensate for minor variations in bath conditions. The final rating compares the inhibited test oil to the noninhibited standard as follows: the rust area of the pieces coated with test oil is substracted from the rusted area of the pieces coated with the standard. The number obtained is divided by the rusted area of the standard and multiplied by 100 to yield the percent improvement over the standard. Thus, the maximum value obtainable is 100% (perfectly clean), while 0% demonstrates equivalence to the standard, and negative values indicate promotion of rust. The lubricating oil used was a 10W–30 motor oil.

Composition:  Merit rating
Lube oil+1.0 wt. percent additive of
 Example 1 _____ 1.9
Lube oil+1.0 wt. percent conventional
 rust inhibitor _____ 0

From the above it is apparent that an additive of the present invention is an effective rust inhibitor.

What is claimed is:

1. A novel composition of matter having the structural formula:

$$\begin{array}{c} \text{R—CH—C} \\ | \quad\quad\quad \backslash \\ \text{CH}_2\text{—C} \quad\quad \text{N—} \bigcirc \text{—N=CH}_2 \\ \| \\ \text{O} \end{array}$$

wherein R comprises a $C_{12}$–$C_{130}$ polyalkenyl group.

References Cited

UNITED STATES PATENTS

| 2,984,654 | 5/1961 | Agius | 252—51.5 |
| 3,039,860 | 6/1962 | Andress et al. | 44—71 |
| 3,087,936 | 4/1963 | Le Suer | 252—51.5 |
| 3,131,150 | 4/1964 | Stuart et al. | 252—51.5 |

FOREIGN PATENTS 269,840 1/1928 Great Britain.

OTHER REFERENCES

Noller, Chemistry of Organic Compounds, (1951) published by W. B. Saunders Co., Phila, Pa., p. 517 most pertinent. Copy available in Scientific Library.

PATRICK P. GARVIN, Primary Examiner

U.S. Cl. X.R.

44—63; 252—51.5